United States Patent [19]

Babcock

[11] Patent Number: 5,845,136
[45] Date of Patent: Dec. 1, 1998

[54] CONTROL OF A FUNCTION OF A COMPUTER OTHER THAN A POWER SUPPLY FUNCTION USING A SYSTEM POWER SWITCH

[75] Inventor: Sean Babcock, Portland, Oreg.

[73] Assignee: Intel Corporation, Santa Clara, Calif.

[21] Appl. No.: 724,803

[22] Filed: Oct. 2, 1996

[51] Int. Cl.$^6$ .................................................. G06F 1/26
[52] U.S. Cl. .................................... 395/750.01; 395/651
[58] Field of Search .................................. 395/652, 651, 395/750.01, 750.07, 750.08, 284, 830, 653

[56] References Cited

U.S. PATENT DOCUMENTS

| | | | |
|---|---|---|---|
| 5,398,333 | 3/1995 | Schieve et al. | 395/652 |
| 5,463,766 | 10/1995 | Schieve et al. | 395/652 |
| 5,522,076 | 5/1996 | Dewa et al. | 395/652 |
| 5,630,142 | 5/1997 | Crump et al. | 395/750.05 |
| 5,704,040 | 12/1997 | Gunji | 395/188.01 |

*Primary Examiner*—Glenn A. Auve
*Attorney, Agent, or Firm*—Kenyon & Kenyon

[57] ABSTRACT

A function of a computer other than a power supply function of the computer may also be controlled using a power control input of the computer. In response to a pressing of a power button or a closing of a power switch, a signal is provided which indicates that a function of the computer other than a power supply function of the computer may be performed. This may be implemented, for example, in response to the pressing of the power button or closing of the power switch for a time period longer than a predetermined time period. In response to a first condition at the power control input (for example, a momentary closing of the power switch or pressing of the power button), power is supplied to the computer. In response to a second condition at the power control input (for example, the closing of the power switch or pressing of the power button for a time period longer than a predetermined time period), a signal is provided indicating that a non-power supply function of the computer should be performed. For example, a basic input/output system (BIOS) program running on the computer performs an entering of a setup mode of the computer, a clearing, setting or a changing of the password, or a clearing of the system image of the computer in response to the pressing of the power button or closing of the power switch for a time period which is longer than a predetermined time period. Such an implementation does not require a user to open a system chassis of the computer and disconnect any configuration jumpers on the motherboard of the computer.

30 Claims, 2 Drawing Sheets

CONTROL OF A FUNCTION OF A COMPUTER OTHER THAN A POWER SUPPLY FUNCTION USING A SYSTEM POWER SWITCH

BACKGROUND OF THE INVENTION

The present invention relates to controlling a function of a computer other than a power supply function of the computer (e.g., a configuration function of the computer). More particularly, the present invention relates to entering a configuration mode of a computer such as a setup mode.

Configuration jumpers are currently used on PC (personal computer) motherboards to provide a variety of functions of the computer. For example, a configuration jumper may be used as a way to instruct the computer to either clear or keep a system image (e.g., a CMOS system image) which is stored in non-volatile memory and provides information as to how the computer system is configured. Additionally, another jumper may be used to enter into a setup mode of the computer (for example, a CMOS setup mode by entering a master CMOS setup screen). Another jumper which is currently implemented on PC motherboards is a jumper used to control the setting, clearing, changing or maintaining of a password of the computer.

Jumpers which previously have been used on PC motherboards of personal computers were hooked up to general purpose input/output (GPIO) ports of the computer. The jumpers have been used to tie the respective GPIO ports to a power voltage source or a ground voltage source.

Typically, a user can set a password in the basic input/output system (BIOS) program of the computer. However, if a user forgets the password which was previously set using the BIOS program, the computer is rendered inoperable, since the password is necessary to enter any application programs of the computer or perform any other functions of the computer. The password jumper currently used on PC motherboards can be disconnected if a user forgets the password. This disconnection clears the password so that the computer can still function without requiring use of the old password. Then the user can re-enter the BIOS program and set a new password or can set no new password to leave the computer in a mode which does not require a user to enter a password in order to perform any functions of the computer.

A need has arisen to reduce the number of configuration jumpers on PC motherboards. Getting rid of the configuration jumpers is advantageous because the jumpers are sometimes misconfigured at assembly time. Additionally, the reduction of the number of jumpers can provide an easier use of the computer by a user. For example, if the user finds it necessary to clear the password, the chassis of the computer must be opened and the configuration jumper for the password must be disconnected. Opening the system chassis to use the configuration jumpers is a time consuming matter for a user and can also result in an inexperienced user doing damage to the system. Additionally, a network administrator, for example, may not want individual users of the computers to be opening the system chassis to disconnect the configuration jumpers. Therefore, it would be advantageous to selectively provide a user with a method of controlling functions of the computer previously implemented by configuration jumpers on the PC motherboards without requiring the user to open the system chassis to connect or disconnect configuration jumpers.

SUMMARY OF THE INVENTION

The present invention allows a user to control a function of the computer without requiring the user to open the system chassis and disconnect any configuration jumpers on the PC motherboard. Specifically, the present invention relates to a method of controlling a function of the computer other than a power supply function of the computer in response to a detection of a power control input of the computer such as a power switch or a power button. For example, a configuration function of the computer may be implemented in response to a power control input of the computer. This control can be implemented in addition to a control of a power supply function of the computer in response to a detection of the power control input.

In an embodiment of the present invention, in response to a pressing of a power button or closing of a power switch, for example, a signal is generated to a power supply control circuit to supply power to the computer in response to that pressing of the power button or closing of the power switch. Additionally, in response to the pressing of the power button or closing of the power switch, a signal can be provided which indicates that a function of the computer other than a power supply function of the computer should be performed. Such a function could include a configuration function of the computer such as clearing a system image (e.g., a CMOS setup image), clearing or setting a password of the computer, or entering the standard setup mode of the computer. The power supply can be turned on in response to any pressing of the power button or closing of the power switch. The controlling of the function other than the power supply function could be provided in response to, for example, a pressing of the power button or closing of the power switch for a time period which is longer than a predetermined time period. In this manner, a user can press the power switch (or power button) briefly to turn on the system power or press the power switch (or power button) for a predetermined amount of time (for example, two seconds) to perform a function other than a power supply function of the computer (for example, entering a setup mode of the computer, clearing, setting or changing the password, or clearing the system image of the computer).

In an embodiment of the present invention, the power control input can be connected so that the power supply function of the computer is always provided in response to the power control input. Additionally, the power control input can be connected so that a function of the computer other than a power supply function of the computer is performed only when the power control input is connected in a predetermined manner. For example, a header can be provided within the computer so that the function other than the power supply function is performed in response to a predetermined condition at the power control input only when the power control input is connected to the header in a predetermined manner. A network administrator, for example, could perform a setup of the computer when the power control input is connected to the header in a first position so that a function of the computer other than the power supply function can be controlled in response to the power control input. Once the network administrator has setup the computer in a preferred manner (for example, setting the password and providing other configuration functions of the computer), the administrator can switch the connection of the power control input to the header to another position so that the power control input is used only to provide a power supply control signal. Once the network administrator switches the power control input and header connection to this position, functions other than power supply functions cannot be controlled using the power control input button. In this manner, the network administrator can be assured that computers will remain configured as originally intended.

A lock on a system chassis of the computer can be provided so that a non-authorized user is not able to open the system chassis and switch the power control input and header connection. In this manner, if any further configuration functions are to be provided, the network administrator can be assured that the functions will be properly performed, since the network administrator can control who has access to the internal portion of the computer within the system chassis.

DETAILED DESCRIPTION

Figure 1:
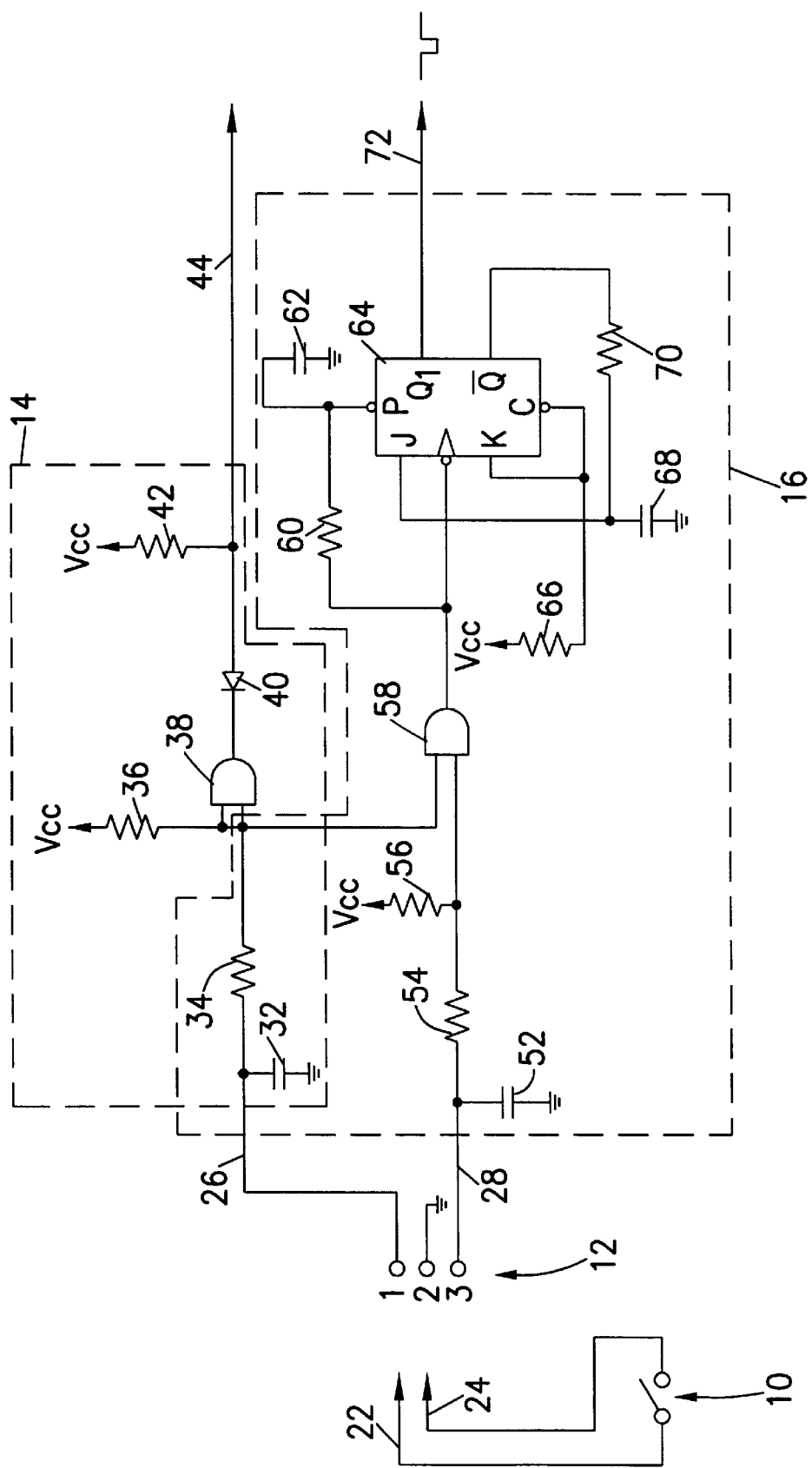
FIG. 1 illustrates an arrangement according to an embodiment of the present invention.

FIG. 1 illustrates an arrangement for selectively providing signals for controlling functions of the computer (or computer system) other than power supply control functions as well as power supply functions in response to a power control input such as a power switch or power button. The arrangement also can be used for providing a signal for power supply control in response to the power control input. The arrangement includes a power switch 10, a header 12, a circuit 14 identified by a dotted line which provides a signal for controlling a function of the computer other than a power supply function in response to a power switch 10 (i.e., in response to a power control input), and a circuit 16 which provides a power supply control signal in response to the power control input provided by the power switch 10. Power switch 10 is a mechanical switch provided within a computer system which is closed, for example, in response to the pressing of a power button by a user which is provided on an external portion of the computer. However, any sort of power control input may be used in implementing the present invention.

Power switch 10 is connected to two terminals, 22 and 24. Header 12 is a three pin header including pins 1, 2 and 3. Pin 1 of header 12 is connected to an input 26 of circuit 14 and of circuit 16. Pin 2 of header 12 is connected to a ground voltage level. Pin 3 of header 12 is connected to an input 28 of circuit 16.

Circuit 14 includes a capacitor 32 and a resistor 34, a resistor 36, an AND gate 38, a diode 40 and a resistor 42. In response to a power control input signal provided at input 26, circuit 14 provides an output signal 44 which indicates that a function other than a power supply function of the computer should be performed. Capacitor 32 includes a first terminal connected to ground and a second terminal connected to input 26 of circuit 14. Resistor 34 includes a first terminal connected to input 26 of circuit 14 and a second terminal. Resistor 36 includes a first terminal connected to a voltage source ($V_{cc}$) and a second terminal connected to the second terminal of resistor 34. AND gate 38 has two inputs and one output. The second terminal of resistor 34 and the second terminal of resistor 36 are connected to both inputs of AND gate 38. Diode 40 includes a cathode and an anode. The output of AND gate 38 is connected to the cathode of diode 40. Resistor 42 has a terminal connected to a voltage source $V_{cc}$ and a second terminal connected to the anode of diode 40. The anode of diode 40 and the second terminal of resistor 42 are connected to the output 44 of circuit 14. Output 44 of circuit 14 is connected to, for example, a general purpose input/output (GPIO) port in the computer system.

Circuit 16 is a one-shot circuit which sends a pulse signal in response to an input signal 26 or an input signal 28 of circuit 16 (i.e., an input signal responsive to a power control input). Circuit 16 includes capacitor 32 and resistor 34 of circuit 14, and additionally includes a capacitor 52, a resistor 54, a resistor 56, an AND gate 58, a resistor 60, a capacitor 62, a JK flip-flop 64, a resistor 66, a capacitor 68 and a resistor 70. In response to a power control input signal at input 28 or at input 26, circuit 16 provides an output signal 72 which is a pulse signal indicating that the power supply should be turned on. Output 72 is provided to a power supply control circuit (not illustrated in FIG. 1).

Capacitor 52 includes a first terminal connected to ground and a second terminal connected to input 28 of circuit 16. Resistor 54 includes a first terminal connected to input 28 and a second terminal. Resistor 56 includes a first terminal connected to a voltage supply ($V_{cc}$) and a second terminal connected to the second terminal of resistor 54. AND gate 58 includes two inputs and one output. A first input of AND gate 58 is connected to the second terminals of resistors 34 and 36 and the input terminals of AND gate 38. The second input of AND gate 58 is connected to the second terminal of resistor 54 and the second terminal of resistor 56. A first terminal of resistor 60 is connected to the output of AND gate 58 and a second terminal of resistor 60 is connected to a P input of JK flip-flop 64. A first terminal of capacitor 62 is connected to ground and a second terminal of capacitor 62 is connected to the second terminal of resistor 60 and to the P input of JK flip-flop 64. JK flip-flop 64 includes a J input, a K input, a P input, a C input, a clock input, a Q output and a Q' output. The clock input of JK flip-flop 64 is connected to the output of AND gate 58 and to the first terminal of resistor 60. Resistor 66 includes a first terminal connected to a power source ($V_{cc}$) and a second terminal connected to the K input and the C input of JK flip-flop 64. Capacitor 68 includes a first terminal connected to ground and a second terminal connected to the J input of flip-flop 64. Resistor 70 includes a first terminal connected to the second terminal of capacitor 68 and the J input of JK flip-flop 64 and a second terminal connected to the Q' output of JK flip-flop 64. The Q output of JK flip-flop 64 is connected to the output 72 of circuit 16. Output 72 provides a pulse signal indicating that the power supply should be turned on. This output signal is connected to a power supply control circuit (not illustrated in FIG. 1).

In a configuration mode of the apparatus of FIG. 1, terminals 22 and 24 of power switch 10 are connected to pins 1 and 2, respectively of header 12. Upon a closing of power switch 10 in response to, for example, a pressing of a power button associated with power switch 10, the ground signal at terminal 2 of header 12 is connected through pin 2 of header 12, terminal 24, power switch 10, terminal 22, pin 1 of header 12 and provided to input 26 of circuit 14 and circuit 16. Upon an initial pressing of the power button and closing of power switch 10, a low voltage signal is provided to input 26.

Upon receipt of the low input voltage 26, circuit 16 provides a low voltage level input signal to the first input of AND gate 58. Therefore, a low voltage signal is provided to the clock input of JK flip-flop 64 and a low voltage level pulse signal is provided at output 72 of one-shot circuit 16 indicating that the power supply should be turned on. That is, upon power up of the computer, if the power switch 10 is closed, the one-shot circuit 16 provides a pulse at output 72 indicating that the power supply should be turned on. This pulse is provided to a power supply circuit (not illustrated in FIG. 1) which is used to supply power to the computer.

Similarly, upon closing of power switch 10, circuit 14 also receives a low voltage level at input 26. In response to the low voltage level provided at input 26, AND gate 38 provides a low output signal. In response to the low output signal of AND gate 38, a low signal is provided at output 44 of circuit 14. The output signal 44 is provided to a GPIO (General Purpose Input/Output) port in the computer system. This signal can be detected by, for example, a BIOS program running on the computer. This signal may be detected by the BIOS program for a predetermined time period to determine if the power switch 10 has been closed for longer than a predetermined time period.

If the power switch 10 is open, a high signal is provided at input 26 of circuit 14 and a high voltage level signal is therefore provided at output 44 of circuit 14. This high voltage level signal provides an indication that no function of the computer other than a power supply function of the computer should be provided in response to the power control input (i.e., in response to a condition of power switch 10). In this manner, if the power switch 10 is momentarily closed but is not maintained closed for a predetermined amount of time, the one-shot circuit 16 will provide the pulse at output 72 to the power supply circuit. However, circuit 14 will provide a high voltage signal at output 44, which indicates that no function of the computer other than a power supply function should be performed.

Upon power up of the computer, if the power button is pushed for a short time and released, thus momentarily closing the power switch 10, the one-shot circuit 16 provides a pulse signal at output 72 which indicates that the power supply should be turned on. When a BIOS program of the computer later tests the value at the GPIO port provided at output 44 of circuit 14, the BIOS program will detect that the power switch 10 is no longer closed (e.g., indicating that the power button is no longer pressed in) and will not enter the master setup screen of the computer, for example.

Upon power up of the computer, if the power switch is pressed and held for a longer period of time than the momentary period of time discussed above, the one-shot circuit 16 provides the pulse at output 72 indicating that the power supply should be turned on similarly to when the power switch 10 is only momentarily closed. However, since the power switch 10 will still be closed when the BIOS program reads the value at the GPIO port provided from output 44 at a predetermined time later, the BIOS program will detect that the power switch 10 is closed (and the power button has been held in) and the BIOS program will enter the master CMOS setup screen, for example. The CMOS setup screen will allow a user access to clear the CMOS system image to set, change or clear the password, or to enter the CMOS setup mode of the computer, for example. The BIOS program can be programmed to wait a predetermined amount of time to detect if the user has intended to have the power switch pushed for the entry of the CMOS setup program or was simply turning the computer system on by closing the power switch only momentarily.

The operation of the arrangement of FIG. 1 will now be described when the terminals 22 and 24 are connected to pins 2 and 3, respectively of header 12. When terminals 22 and 24 are connected to pins 2 and 3 of header 12, circuit 14 always provides a high voltage level at output 44 since no low voltage level is ever provided to input 26. Therefore, when the BIOS program tests the signal at the GPIO port provided from output 44, the BIOS program will not enter the master setup screen. Therefore, it is impossible to enter the master setup screen when the terminals 22 and 24 of power switch 10 are connected to pins 2 and 3 of header 12 rather than to pins 1 and 2 of header 12.

When pins 22 and 24 of power switch 10 are connected to pins 2 and 3 of header 12, the one-shot circuit 16 provides a pulse at output 72 when the power switch 10 is closed. Therefore, when terminals 22 and 24 are connected to pins 2 and 3 of header 12, respectively, the power supply function may be provided in response to the closing of power switch 10. However, output signal 44 remains at a high voltage level and the BIOS program will not enter the master setup mode in response to the power switch 10 as described above.

In an embodiment of the present invention, the header 12 and terminals 22 and 24 of power switch 10 are provided within a system chassis of a computer. Therefore, the system chassis must be opened to switch the connection of the power switch 10 between the first connection to terminals 1 and 2 of header 12 and the second connection to pins 2 and 3 of header 12. This is preferably performed by a network administrator or other authorized personnel. For example, the network administrator can connect terminals 22 and 24 to pins 1 and 2 of header 12 and then perform setup and configuration functions of the computer by closing the power switch 10 in response to the pressing of the power button for a period of time longer than a predetermined time period. However, once the system is configured by the network administrator, the administrator can switch terminals 22 and 24 to be connected to pins 2 and 3 of header 12. The network administrator can close the system chassis and provide a lock on the chassis. In this manner, no functions other than power supply functions of the computer can be implemented by a closing of the power switch 10 or pressing of the power button of the computer when the terminals 22 and 24 of power switch 10 are connected to pins 2 and 3 of header 12.

In an embodiment of the present invention, the values of various elements of FIG. 1 are provided as follows.

Capacitor 32—0.01 $\mu$F
Resistor 34—330 ohm
Resistor 36—10 kohm
AND gate 38—74HC08
Resistor 42—10 kohm
Capacitor 52—0.01 $\mu$F
Resistor 54—330 ohm
Resistor 56—10 kohm
AND gate 58—74HC08
Resistor 60—100 kohm
Capacitor 62—1 $\mu$F
JK flip-flop 64—74HC112
Resistor 66—47 kohm
Capacitor 68—1 $\mu$F
Resistor 70—220 kohm While the above values have been provided for an embodiment of the arrangement of FIG. 1, it is noted that other values of the various components of the arrangement may be used in implementing the present invention.

Additionally, circuit 14 of FIG. 1 has been described as providing an output signal 44 which is detected by a BIOS program running on the computer to determine if the power switch 10 (or other power control input) has been closed for a predetermined time period. However, rather than using a BIOS program, the present invention may be implemented by using a hardware implementation of detecting the output signal 44. For example, a hardware counter or hardware timer may be used to determine if the power switch or other power control input has been closed (or activated) for a predetermined time period.

Further, although, the present invention has been described as controlling a function other than a power supply function upon the closing of the power switch for a time period longer than a predetermined time period, other conditions of a power control input may be detected according to other embodiments of the present invention.

Figure 2:
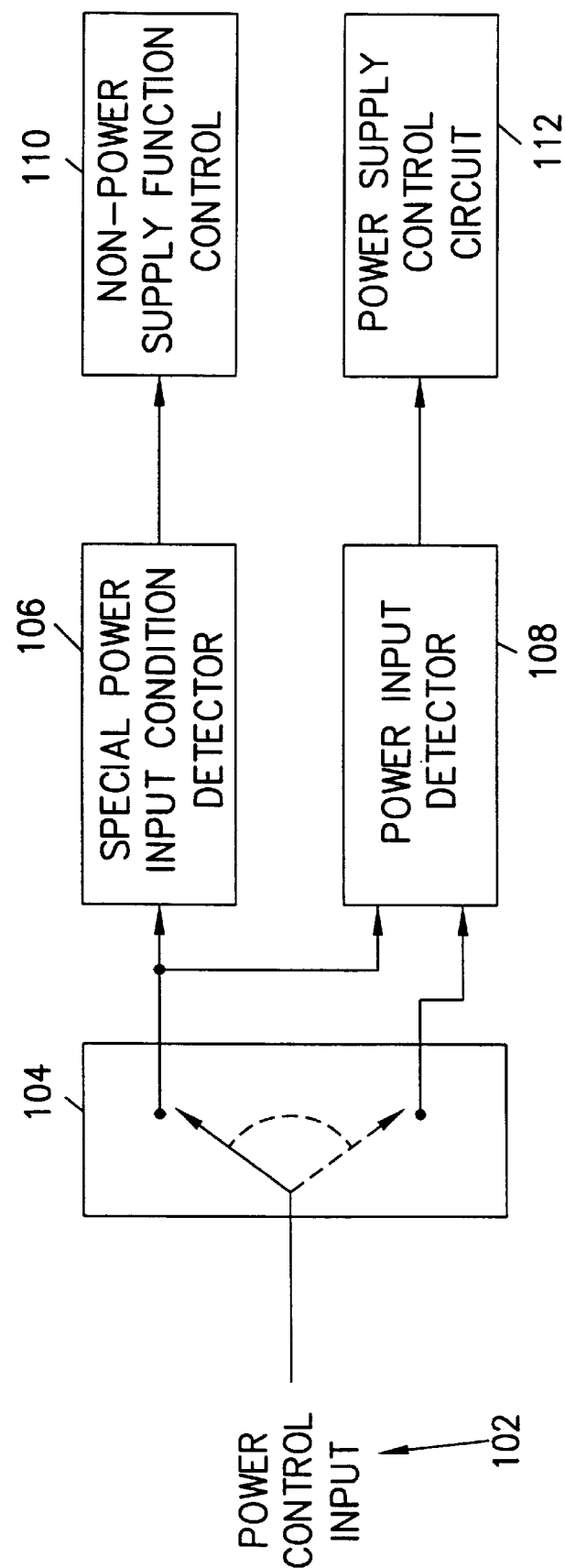
FIG. 2 illustrates an arrangement according to another embodiment of the present invention.

FIG. 2 illustrates an embodiment of the present invention. FIG. 2 illustrates a power control input signal 102, a switch 104, a special power control input condition detector 106, a power control input detector 108, a non-power supply function control circuit 110 and a power supply control circuit 112. Switch 104 includes one input and two outputs. Based on a switching of switch 104, the power control input signal is provided in a first output (top) position of switch 104 to inputs of both the special power control input condition detector 106 and the power control input detector 108. However, if the power control input is switched to a second output position (low position in FIG. 2), the power control input signal is provided only to the power control input detector 108. If the power control input is connected by switch 104 to the first output position, special power control input condition detector 106 detects a special power control input condition of the power control input signal 102. For example, special power control input condition detector 106 can detect whether the power control input signal 102 has been provided for a time period which is longer than a predetermined time period. For example, this predetermined time period could be one second, two seconds, five seconds, ten seconds, etc. Special power control input condition detector 106 can be a circuit similar to circuit 14 of FIG. 1 used in conjunction with a BIOS program running on the computer similar to that previously described in relation to FIG. 1. Special power control input condition detector 106 provides an output signal indicating that a function of the computer other than a power supply function of the computer should be performed. If the output of special power control input condition detector 106 indicates that a function of the computer other than a power supply function should be performed, non-power supply function control circuit 110 performs a non-power supply function of the computer. Such a non-power supply function can include a configuration function of the computer such as entering a master setup screen, entering the standard setup, clearing, setting or changing the password, or clearing the setup system image of the computer. However, this function is only performed when a certain condition of the power control input is provided by switch 104 to the input of special power control input condition detector 106 (e.g., when the power control input has been provided for a predetermined amount of time).

When switch 104 provides power control input 102 to the first (higher) output or to the second (lower) output, power control input detector 108 detects whether or not the power control input signal 102 is provided. Once the power control input detector 108 indicates that the power control input signal has been provided (for example, a momentary provision of a power control input signal by a closure of a power switch or pressing of a power button), power control input detector 108 provides an output signal indicating that a power supply function should be performed. Power control input detector 108 can be a power control input detector circuit similar to one-shot circuit 16 of FIG. 1. In any case, power control input detector 108 provides some sort of signal indicating that power should be supplied to the computer in response to the power control input 102. Power supply control circuit 112 provides power supply to the computer in response to the output of the power control input detector 108.

What is claimed is:

1. A method comprising steps of:
    detecting a power control input of a computer, said power control input capable of being connected in at least a first predetermined manner and a second predetermined manner; and
    when the power control input is connected in a first predetermined manner, controlling a function of the computer other than a power supply function of the computer in response to said step of detecting the power control input.

2. A method according to claim 1, wherein said power control input comprises at least one of a power switch and a power button of the computer.

3. A method according to claim 1, wherein said controlled function is a configuration function of the computer.

4. A method according to claim 1, wherein said controlling step includes controlling a function of at least one of clearing a system image of the computer, setting a password, changing a password and entering a setup mode of the computer.

5. A method according to claim 1, wherein said detecting step detects whether the power control input has been activated for a time period which is longer than a predetermined time period.

6. A method according to claim 1, further comprising a step of controlling a power supply of the computer in response to a detection of the power control input of the computer.

7. A method comprising steps of:
    detecting a first connected condition at a power control input of a computer;
    detecting a second connected condition at a power control input of a computer; and
    in response to said step of detecting the second connected condition at the power control input, providing a signal indicating that a function of the computer other than a power supply function of the computer should be performed.

8. A method according to claim 7, further comprising steps of:
    detecting a second condition at the power control input of the computer;
    in response to said step of detecting the second condition at the power control input, providing a signal indicating that a power supply of the computer should be turned on.

9. A method according to claim 8, wherein said second condition is an activation of said power control input and said condition is an activation of said power control input for a time period which is longer than a predetermined time period.

10. A method according to claim 8, further comprising a step of supplying power to said computer in response to said signal indicating that a power supply of the computer should be turned on.

11. A method according to claim 7, wherein the power control input comprises at least one of a power switch and a power button.

12. A method according to claim 7, further comprising a step of performing a function of the computer other than a power supply function of the computer in response to said provided signal.

13. A method according to claim 12, wherein said performing step includes at least one of clearing a system image of the computer, setting a password, changing a password and entering a setup mode of the computer.

14. A computer comprising:

a power control input capable of being connected in a first predetermined manner and a second predetermined manner; and a circuit having an input connected to the power control input and having an output indicating that a function of the computer other than a power supply function of the computer should be performed; wherein when said power control input is connected in said first predetermined manner, the output indicates that a function of the computer other than a power supply function of the computer should be performed.

15. A computer according to claim 14, further comprising an input/output port connected to said output of said circuit.

16. A computer according to claim 14, further comprising a second circuit having an input connected to the power control input and having an output indicating that a power supply function of the computer should be performed.

17. A computer according to claim 14, wherein in response to said output of said circuit, said computer performs at least one of clearing a system image of the computer, setting a password, changing a password and entering a setup mode of the computer.

18. A computer comprising:

a power control input; and a circuit having an input connected to the power control input and having an output indicating that a function of the computer other than a power supply function of the computer should be performed, wherein the output of said circuit indicates whether a setup mode of the computer is to be entered.

19. A computer comprising:

a power control input; and a circuit having an input connected to the power control input and having an output indicating that a function of the computer other than a power supply function of the computer should be performed, and further comprising a BIOS program running on said computer, wherein said BIOS program enters a setup mode of said computer in response to said output of said circuit.

20. A computer comprising:

a power control input; and a circuit having an input connected to the power control input and having an output indicating that a function of the computer other than a power supply function of the computer should be performed, wherein said computer enters a setup mode in response to said output of said circuit.

21. A computer comprising:

a power control input;

a header connected to said power control input; and a circuit having an input connected to said header and an output, wherein said input of said circuit is connected to said power control input when said power control input is connected to said header in a first position, and wherein said input of said circuit is not connected to said power control input when said power control input is connected to said header in a second position, said output of said circuit indicating that a function of the computer other than a power supply function of the computer is to be performed when said power control input is connected to said header in said first position.

22. A computer according to claim 21, wherein said power control input comprises at least one of a power switch and a power button.

23. A computer according to claim 21, wherein said circuit detects whether said power control input has been activated for a time period longer than a predetermined time period.

24. A computer according to claim 21, wherein in response to said output of said circuit, said computer performs at least one of clearing a system image of the computer, setting a password, changing a password and entering a setup mode of the computer.

25. A computer according to claim 21, further comprising a second circuit having an input connected to said power control input when said power control input is connected to said header in said first position and in said second position, said second circuit having an output indicating that a power supply of the computer should be turned on.

26. A computer according to claim 25, further comprising a power supply control circuit having an input connected to said output of said second circuit.

27. A computer according to claim 21, further comprising a chassis, wherein a switching between said first position and said second position may be implemented only by opening said chassis.

28. A computer according to claim 21, further comprising:

a chassis; and a lock on said chassis, wherein a switching between said first position and said second position may be implemented only by unlocking the lock and opening the chassis.

29. A computer comprising:

a power control input;

a first circuit having an input connected to the power control input and having an output responsive to the input;

a power supply control circuit having an input connected to the output of the first circuit; and a second circuit having an input connected to the power control input and having an output indicating that a function of the computer other than a power supply function of the computer should be performed.

30. A computer according to claim 29, wherein in response to said output of said second circuit, said computer performs at least one of clearing a system image of the computer, setting a password, changing a password and entering a setup mode of the computer.

* * * * *